3,367,752
FLANS AND PROCESS
James R. Johnson, White Bear Lake, Minn., assignor to Minnesota Mining and Manufacturing Company, St. Paul, Minn., a corporation of Delaware
Continuation-in-part of application Ser. No. 331,649, Dec. 17, 1963. This application Oct. 7, 1965, Ser. No. 493,859
20 Claims. (Cl. 29—190)

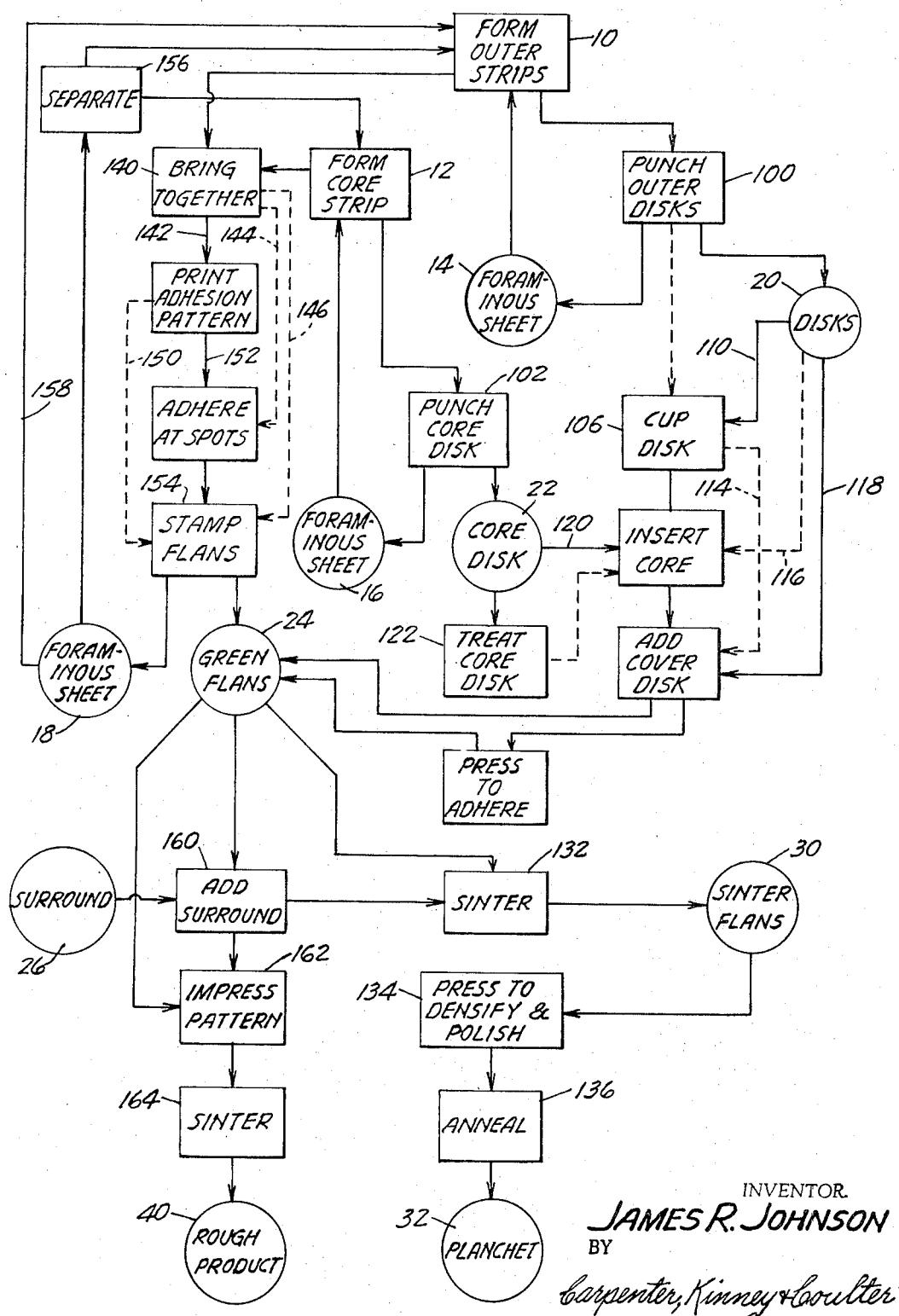

This application is a continuation-in-part of application Ser. No. 331,649, filed Dec. 17, 1963, which was a continuation of application Ser. No. 26,372, filed May 2, 1960, now abandoned, as a continuation-in-part of application Ser. No. 746,263 which was filed July 2, 1958, now abandoned, as a continuation-in-part of application Ser. No. 657,503, filed May 7, 1957, now Patent No. 3,079,273.

This invention relates to a new and novel process for the preparation of laminated metallic flans and planchets.

As here employed the term flan is used to refer to a metallic piece intended for working by stamping to form a coin, medal or other fabricated articles. Although much of the following disclosure will be in terms of simple disc-shaped flans such as are suitable for coining operations, this process is equally applicable to shapes of any outline and is thus useful in the preparation of gold-filled jewelry mountings, Sheffield plate silverware and other laminated metallic articles. The process is particularly useful when at least one of the metals being used is relatively expensive such that recovery of scrap values is necessary, but is also useful even when less valuable metals are used in that the process of the invention eliminates scrap.

Ancient coins are known which have an outer silvery layer, usually referred to as a wash, and a copper core. The process of manufacture and the manner in which the silver coating was applied are believed to be entirely unknown.

The process of this invention commences with flexible leathery sheets comprising the desired metallic compositions in powdered form with a suitable organic binder. For instance, a laminate with an overall composition of 40 percent by weight of silver and 60 percent by weight of copper is preferable for esthetic reasons to a homogeneous alloy of that composition, known as billon, which is rather coppery in appearance. The laminate may be made with the outer surfaces of an esthetically attractive high silver alloy, e.g., 80 percent silver, and the core of a low silver billon alloy, e.g., 20 percent silver. In any event, leathery sheets are prepared comprising powdered metals in the desired proportions and of thicknesses sufficient to give the desired overall composition.

These leathery sheets are superimposed in surface to surface contact to form a laminate, and the binder is adhered in predetermined areas to form a green bond. The green-bonded laminate is cut to the desired shape and fired to the sinter-welded metallic state.

A special advantage of the process of the invention is the ease with which certain special effects are accomplished, as is more specifically detailed hereinafter. It may be noted that it is a relatively simple matter to introduce alloying amounts of tracer elements as counterfeit detectors and/or to show source or date of manufacture. For example, inclusion of a microscopic but spectroscopically detectable trace of an element such as lithium might be employed to code coins issuing from a particular mint over a particular period. Other analytical methods may, of course, also be employed for the detection of tracer elements. It is also feasible to produce coins in which relatively inexpensive, hard, wear-resistant metals enclose a core containing an intrinsically valuable amount of a precious but soft metal such as gold, platinum, etc. which is not then subject to dissipation by wear.

Binders for the leathery sheets should be selected to be compatible between the different laminae, that is soluble in a common solvent. Most conveniently, the same binder is used for all of the laminae in each composite. Compositions may be prepared as suggested, for example, by Wainer, U.S. Patent 2,593,943, or Joyner, U.S. Patent 2,902,363, using binders and the desired metals. It is preferred to use readily available binders such as methyl methacrylate and methyl cellulose, which are representative of hydrophobic and hydrophilic binders, respectively. The latter may be in any of the commercially available forms or compositions but preferably are selected for ease of operation, such as that composition available under the designation Methocel 60 HG–4000.

The particle size of the metal powder may vary over a wide range. Where particle size is referred to herein as mesh or sieve size, U.S. Standard Sieve Series are used. Thus, particle sizes of a fineness ranging between 80 mesh (0.177 mm.) and 400 mesh (0.037 mm.) can be handled readily in the process. Particles consisting of 325 mesh plus the fines normally present as the result of the milling are conveniently used. In some cases, however, where low shrinkage in firing is desired, a mixture of coarse and fine particles is used—for example, 50 to 70 parts of minus 30 mesh (0.59 mm.) plus 50 to 30 parts of minus 325 mesh (0.044 mm.) powder. As is usual in powder metallurgy, variously sized metal powders may be used in combination to achieve special results.

The Metal Powder Industries Federation standard size numbers, obtained by using the Fischer Standard Sub-sieve Series test, can also be used to identify the particle size, particularly where the smaller particle sizes are involved.

The invention and several embodiments are more particularly described by reference to the drawing, representing the flowsheet shown as FIGURE 1. In this flowsheet two-digit numbers are used to refer to materials, i.e., actual items either used as intermediates in the process or obtained as ultimate products. Three-digit numbers are used for process steps.

Inasmuch as the invention is directed to producing laminated articles, at least two different metallic combinations are required. These are in general combinations of at least two metals or alloys but also include single metals.

Sintering temperature ranges for powdered metals and alloys are known to be from about 60 to 97.5 percent of their melting temperatures in degrees Kelvin. For the laminated articles of this invention, those metals or alloys can be used together which have overlapping sintering temperatures. These combinations are mutually complementary and it will be apparent that two or more metals can be laminated to form the finished article.

Metals such as copper, nickel, silver and gold, the usual coinage, jewelry and metal-ware materials, are considered to be the presently preferred embodiments of the invention. However, the process is generally applicable to combinations even including minor amounts of refractory metals, relatively non-malleable and/or more reactive metals or even metallic compounds which, as noted above, may be included as tracers, to promote abrasion resistance or for other reasons. Stainless steel, for example, is advantageously clad with copper for improving heat transfer properties in cooking vessels.

It is one of the outstanding advantages of the process of the invention that additions of adjuvant substance may be made with no difficulty and with no significant alteration of process steps. Subsequent changes in particular additives cause no change in operation. Thus, it would be at least conceivable, by incorporation of suitable traces of uncommon elements in a coinage-minting operation, to identify not only the mint but even particular batches or days of operation if that much detail were desired. Likewise, a manufacturer of gold-overlaid base metal could incorporate a trace element to characterize his product, and could also vary the gold overlay to give red, green, yellow or white gold overlay or gold-filled sheet as desired. Some of the latter products are not believed to have been feasible heretofore.

The process of the invention will now be described in greater detail using copper, silver and nickel as illustrative metals; it is to be understood that other complementary metals can be used and that the example is in no way limiting. All parts are by weight, unless otherwise specified.

Referring to the flowsheet, the process commences with leathery sheets 10 and 12 consisting essentially of powders of metals, and compounds convertible thereto, in proportions on a weight basis corresponding to the desired final composition of the lamina. Thus, if a coin is to be produced having an inner core of substantially pure copper and surface laminae of 75 percent copper and 25 percent nickel as provided for in the Coinage Act of 1965 of the United States, green sheets are prepared in which the metals are in the desired proportions using metal powders of an average diameter less than about 40 microns, uniformly distributed in an amount of plasticized organic polymeric binder sufficient to provide leathery consistency to the sheet. Suitably for powders such as copper, silver and nickel and alloys and mixtures thereof having densities of about 8.9 to 10.5 g. per cc., the proportion of binder is about 3 to 7 percent by weight. Solvent and plasticizer are additionally employed to provide the desirable consistency.

A procedure which has been very useful in producing laminated coin blanks has been to produce leathery outer sheets by first dry blending, for 3 minutes in a sigma blade mixer, 23.7 parts of carbonyl nickel powder of particle size having Fischer number 3–5 microns with 71.3 parts of chemically precipitated copper powder of particle size having Fischer number 4 microns and 5 parts of the methyl cellulose available commercially under the designation Methocel 60 HG–4000. The dry blend is then moistened by blending in 3 parts of glycerin and 18 parts of water. This requires about 5 to 10 minutes to produce a workable mass having a consistency approximating that of potter's clay.

The inner core sheets are produced by similarly blending 95 parts of copper powder with 5 parts of methyl cellulose and adding 3 parts of water and 18 parts of glycerin. Working on a rubber mill will improve the consistency of the core material. Each composition is formed into a sheet of the desired thickness suitably on a calender with one heated roll, to facilitate leathery strip formation.

Thickness of the leathery green sheet is determined by the amount of shrinkage expected on sintering. This is a characteristic which may vary with powder size, binder, etc.; once determined for a particular mixture, it is constant and one can readily establish the thickness required for any specific final product thickness dimension.

The self-supporting leathery strips as formed may be provided with a polymeric support sheet to facilitate handling or to serve as a separator or parting sheet when the leathery strip is wound onto a supply roll. Polyethylene terephthalate sheet is quite satisfactory, as are also silicone, wax or polyethylene coated papers. With these proportions of components, the leathery strips contain satisfactory amounts of moisture for easy working and manipulation. The sheets may be further dried if desired. For adhering them together, the sheets can simply be moistened with water to produce any desired degree of mutual adhesivity.

The adhered sheets form a green-bonded laminate, which is strong enough for handling in the following cutting and firing steps.

The desirable concentration of solvent for the binder is readily recognized as being sufficient to ensure adequate flexibility of green laminae but not so much as to produce surface liquidity or tackiness toward equipment. It may be desirable to flash dry that side of a leathery strip which is to be contacted by a punch, while leaving the other side at essentially the moisture content of the strip as prepared. However, the face of the punch can be coated with a polymer such as polytetrafluoroethylene or the like, to assist in releasing the punched-out disc.

Several methods are available as embodiments of the invention by which the laminae are superimposed. In one variation, discs are punched from the separate green sheets as shown by steps 100 and 102. It will be recognized that discs are specified only because the invention is being illustrated with respect to coining operations and it is quite common for coins to be of generally circular outline. Generically the pieces punched out are termed plaques, and they may be of any desired outline.

The sheets from which the plaques or discs have been punched are foraminous sheets, 14 and 16, and these sheets are returned directly to the process step in which the respective sheet is produced. A small amount of solvent (water) may need to be added, but with milling or thorough mixing the scrap readily becomes incorporated into the sheet-forming material. This is a very distinct advantage of the process of the invention, namely that recovery of these "trimmings" is very convenient and easy, with no problems of refining or remelting. Furthermore all of the metals put into the process as powders are ultimately recoverable as product, whereas in conventional rolling operations much of the effort of rolling is lost when the trimmings are remelted.

The plaques or discs punched out of the sheets, 20 and 22, may be assembled to form flans in any of several alternative embodiments of the invention. Cupped outer laminae may be obtained either by punching directly, step 106 shown by a broken line, or from a disc 20 by step 110. The advantage of such a procedure is that the rim of the cupped disc serves as a surround so as to hide at least part of the edge of the core disc 22 which is inserted therein in step 120. Another cupped disc can be applied as a cover disc in the alternative step 114, shown by a broken line. Of course the cupped disc may be so deeply cupped as to hide the entire edge of the core disc and a flat disc can be used as a cover.

Appropriate measures are taken to adhere the cups, core and cover together to form a green-bonded laminate. The use of water as above, or heating with some pressure when thermoplastic binders are used, suffices.

Other alternative embodiments of the invention involve the assembly of flat plaques or discs by step 116 or 118 as will be evident from the flowsheet. Step 118 will be seen to include the application of a flat cover disc to either a flat or cupped disc and core disc. If desired, the core disc 22 may be treated in step 122 to promote adhesion or to apply an identifying material before insertion in the core. A prefered treatment is one which promotes adhesion without the occlusion or entrapment of air. The assembled discs form a green flan 24, which is desirably pressed slightly in step 130 to relieve any irregularities and promote adhesion although this step is not necessary.

Referring again to the flowsheet, outer strips 10 and core strip 12 are brought together in step 140 in the proper sequence but not necessarily in contact. Several alternative embodiments of the invention are contemplated.

In step 142 an adhesion pattern is printed employing a suitable solvent for moistening, for example, water is suitable for moistening methyl cellulose. Adhesion is then effected at spots or generally over the whole sheet, depending on the pattern adopted in step 152. The two steps may be combined in alternative step 144. The sheets adhered as determined by the pattern are then stamped or died out in step 154 to produce green flans 24. It will be seen that alternative procedures are contemplated. In step 146 green flans are stamped out directly as the sheets are brought together. The pressure of the stamping operation and texture or consistency of the sheets can be controlled so that the excised discs adhere sufficiently without further moistening or the addition of adhesive, as is effected in step 142. In another alternative embodiment, after printing of the adhesion pattern, flans are stamped out, directly, by step 150.

The leathery sheets after they are superimposed and adhered form a composite sheet from which the green (unfired) laminated articles of the invention can be cut, stamped or otherwise shaped into predetermined geometrical configuration.

Whichever of these several processes is followed, flans 24 and foraminous laminated sheet 18 are provided. One advantage of the process of the invention is that sheet 18 may be relatively readily re-separated into the leathery core and outer strips by parting step 156 in which the three strips are peeled apart. This is possible even if step 142 involved complete moistening of surfaces because these steps are carried out sequentially at a rapid rate and in less time than would be necessary for adhesion to exceed the strength of the binder. In the event that other considerations of operation prevail, it is possible to return the composite foraminous sheet to the preparation of outer strip in step 158. When this route is elected, a greater number of flans may be cut relatively close together as no requirement for strength for peeling need be placed on the foraminous sheet. This may be of advantage when using cupronickel outer laminae with a pure copper conductive core to avoid possible contamination and resultant change of conductivity of the pure copper core.

In general, the stamping operation 154 will effect sufficient adhesion of the flans 24 obtained by steps 140 to 150, and pressing step 130 will only be applied to flans produced in steps 110 to 120.

Flans produced by steps 116, 118 and 140 to 150 generally will show the core on the edges. This can be obviated by employing slightly larger outer laminae 20 and a pressing step 130. Another applicable method is to attach a surround to green flans 24 by step 160. This may be accomplished by adhesion of a strip of leathery, outer lamina, or ribbon; or by applying a thick slurry of the composition of the outer laminae using any conventional manual or automated technique.

Whether surrounds are added to the green flans 24 or not, the latter are sintered in step 132 to give sintered flans 30 which are pressed to densify and polish them in step 134. They are annealed if desired in step 136 to give planchets 32. These latter are suitable for minting of coins by standard procedures. Standard procedures of operation as used heretofore are applicable thereto, for example, they may be especially polished for the minting of proof coins, but of course this is not generally necessary.

If desired, a different procedure may be employed, namely coining green flans with or without surround to impress the desired ultimate pattern. Such a procedure is embraced in step 162 of the flowsheet, and is followed by sintering step 164.

In both the above sintering steps 132 and 164, the procedure followed is first to remove solvent at relatively low temperatures, then to eliminate the binder at somewhat higher intermediate temperatures and finally to heat to about 60 to 97.5 percent of the melting point temperature (in degrees Kelvin) on an absolute scale to effect sintering. This effects sintering of particles and sinter-welding between laminae. In the process, the binder is decomposed or volatilized and eventually is essentially completely removed. During the sintering, a metallurgical bond is formed in which the boundary between the laminae is obliterated as a line of dehiscence or delamination, although it may be detectable or even visible as a result of the compositional gradient thereacross.

In general it is advantageous, but not necessary, to control the atmosphere in the furnace in accordance with metallurgical practice relating to the metals being worked. Inasmuch as copper is commonly one of the metals present, it is generally desirable that the final sintering operation, at least, be in a reducing or non-oxidizing atmosphere such as hydrogen, although oxidizing conditions may be required during removal of the binder.

It is also feasible and quite advantageous to employ the sintered flans 30 for the coining or pattern impressing operation, which then also serves to densify and polish them and is embraced by step 134. Whether an annealing step 136 will then be needed depends on the metallurgical properties desired in the coins or other laminated products. Other finishing operations such as tumbling, pickling or lustering may be employed as desired without departing from the spirit of the invention.

To illustrate this process further, three rolls of leathery sheet are provided. One roll, the billon roll, contains pure copper and pure silver powders in the weight proportion of 4 to 1 with sufficient methyl cellulose to make a leathery green sheet, i.e., approximately 5 parts of methyl cellulose, 3 parts of glycerin and 15 parts of distilled water for 95 parts of metal powders. The sheet is made to be about 2.28 mm. (0.090 inch) thick. The other two rolls of sheets, which are made to be 0.48 mm. (0.019 inch) thick contain pure copper and pure silver in the inverse ratio, 1 to 4, in a similar binder composition. It will be evident that prealloyed powders can also be used.

The three rolls are fed through rollers and past printing rollers which "print" spots of water about 1.5 cm. in diameter on opposite sides of the billon roll and on the inner surfaces of the other two rolls at distances of 4 cm. apart on centers so that the moistened spots are in register as the three sheets come together and are adhered as they pass through the nip of a pair of rollers. Having passed this nip, which exerts only sufficient force to effect adhesion, the laminate which is, so to speak, spot-adhered, passes to a stamping machine which stamps flans of the desired size, for example, 35 mm. diameter, so as to include each spot of adhesion. Register of the stamping operation and the adhesion of spots is achieved by adjustment of distances or by use of marks on the laminae which can be sensed at the stamping operation, for example, colored or magnetic spots, intermittent notching or scoring of sheet edges, etc.

Flans are prepared similarly employing, for example, methyl methacrylate as a thermoplastic hydrophobic binder. Adhesion is then readily effected by momentary, selectively spaced heating of the several laminae either before or immediately after they are in contact.

At this point the flans which comprise three partially and temporarily adhered laminae are sent forward to further firing and/or consolidation steps as shown in the flowsheet. The foraminous sheets no longer are strongly adhered and separate readily, although there may be very slight adhesion around the openings if humidity or temperatures are too high. The foraminous sheets, after separation, are returned to the operation for producing the next sheet of that composition, e.g., upper and lower silver sheets or middle billon sheets. Spacing in the stamping operation is advantageously designed so that the recovered foraminous sheets will be self-supporting, but as noted above, all of the trimmings may be combined.

The flans are further processes in the production of planchets for coins by a first mild stamping operation to effect straightening and minor consolidation, which may follow a short drying, followed by firings to remove the binder and plasticizer, e.g., at 200° C., and to sinter-weld the laminae, e.g., at 1000° C. in hydrogen, thereby producing metallurgical bonds over the entire included areas of contact of the compositions.

As used herein, the term "sinter-welded" means fastened together by a thermal-rigidification step, including the step of interdiffusing or sintering contacting portions of films or sheets using only materials having the composition of the films or sheets themselves. The weld area, or interdiffusing area, or transition zone, between sheet members is formed by thermal unification of temporary bonds formed using constituents or ingredients common to or at least mutually compatible with the sheet members to be joined, e.g., heat, which adds no material, or solvent which effects superficial mixing of the binders in the sheets.

The final fired articles are integral in that the joints are not separately identified by lower mechanical strength than the materials of the contacting surfaces of the sheet members themselves. The sinter-welded bond is a true metallurgical bond characterized by the transition in composition from one to the other side. When firing is completed the flan is integral with no weakness other than the inherent strength of the alloy compositions.

In producing coining planchets, a further stamping operation to achieve higher density may be desirable as it may be found that certain coining dies may operate more effectively on a somewhat denser planchet.

Essentially the above process is repeated using other compositions for other purposes. Thus leathery sheets containing a gold alloy can be united to a sheet comprised of brass or copper to make a gold-filled sheet after firing. A particular advantage in the production of gold-filled ware is that compositions of the laminae may be controlled so that in many cases the final shaping or stamping effects flow of the gold alloy over edge and end surfaces which would otherwise have to be plated in the final article. Furthermore, relatively thick billets of gold and copper laminae can be made, which can be rolled to thinner gauges. Sterling silver overlays and laminates on e.g. copper can be made in the same way.

What is claimed is:

1. A process for producing malleable laminated articles consisting essentially of at least two metallic laminae, the materials thereof being mutually complementary and compatible in properties, and the said laminae being bonded by sinter-welded metallurgical bonds, which comprises (A) superimposing sheets of predetermined thicknesses consisting essentially of powders of metals, and compounds convertible thereto, in proportions on a weight basis corresponding to the desired final compositions of the respective laminae, said powders being uniformly distributed in an amount of plasticized organic polymeric binder sufficient to provide leathery consistency to said sheets, said sheets being in surface-to-surface contact to form a laminate and the abutting surfaces thereof being green-bonded by said binder in predetermined areas and (B) reducing green-bonded areas of said laminate to the sinter-welded metallic state.

2. The process of claim 1 wherein sheets of relatively extensive area are brought into face to face relationship continuously.

3. The process of claim 1 wherein sheets of respective compositions are superimposed as discrete, substantially congruent plaques cut from continuous self-supporting, relatively large leathery sheets.

4. The process of claim 3 wherein at least one outer disc-shaped plaque is further formed so as to be receptive of a core plaque.

5. The process of claim 3 wherein a surround of the composition of the outer laminae is additionally applied so as to cover exposed portions of internal laminae.

6. The process of claim 2 wherein two outer sheets are brought into contact with a central leathery core sheet by knife-coating thereon.

7. The process of claim 2 wherein two outer leathery sheets are brought into contact with a central leathery core sheet at least portions of the contacting surfaces being aggressively adherent.

8. The process of claim 2 wherein two outer leathery sheets are brought into appropinquity to a central core sheet and contact is established by intermittent punching through the three sheets to give green flans of a desired outline and the laminated green flans are thereafter separated from the foraminous sheet.

9. A laminated leathery green flan produced employing the process of claim 1, comprising adhered laminae comprising in totality a major proportion of copper and a minor proportion of nickel or silver together with organic binder and sufficient solvent and plasticizer therefor to confer formability thereon without inducing tackiness.

10. A laminated planchet adapted to further mechanical forming operations, characterized by sinterwelded metallurgical bonds between laminae produced from a leathery green flan of claim 9 by thermal elimination of non-metallic components and heating sufficiently to effect sintering of the residual metallic particles.

11. A laminated planchet according to claim 10, additionally densified under pressure, characterized by planished surfaces, at least 95 percent of theoretical density and by the ability to undergo bending with cold-working without delamination.

12. In a process for the preparation of laminated metallic flans consisting essentially of at least two dissimilar compositions by the process of claim 1, the steps in combination of
   (I) treating at least one surface of at least one leathery unfired lamina to produce surface adhesivity in predetermined areas,
   (II) bringing at least two leathery unfired laminae into superimposed contact thereby effecting adhesion thereof in predetermined areas,
   (III) cutting flans of predetermined configuration from adhered areas of said laminae, and
   (IV) separating unadhered foraminous laminae according to their respective compositions.

13. In a process for the preparation of laminated metallic flans consisting essentially of at least two dissimilar compositions by the process of claim 1, the steps in combination of
   (I) depositing laminate-adhesive material within predetermined areas of surfaces of at least two leathery, unfired laminae,
   (II) bringing said laminae into contact, whereby adhesion of predetermined areas is effected,
   (III) cutting flans of predetermined configuration from adhered areas of said laminae, and
   (IV) separating unadhered foraminous laminae according to their respective compositions.

14. In a process for the preparation of laminated metallic flans consisting essentially of at least two dissimilar compositions by the process of claim 1, the steps in combination of:
   (I) within predetermined geometrically disposed areas of opposing surfaces of at least two leathery sheets consisting essentially of selected powdered metals and organic binder, depositing softening solvent for said organic binder in amount sufficient to provide surface tackiness,
   (II) bringing said leathery sheets in contact, with said geometrically disposed areas in register, whereby adhesion thereof is effected,
   (III) cutting flans of predetermined configuration including said geometrically disposed areas, and
   (IV) separating unadhered leathery sheets according to their respective compositions.

15. In a process for the preparation of laminated metallic flans consisting essentially of at least two dissimilar compositions by the process of claim 1, the steps in combination of:
   (I) superimposing and bringing into contact opposing surfaces of at least two flexible leathery sheets consisting essentially of selected powdered metals and organic binder, containing a sufficient amount of solvent for said organic binder to provide surface adhesion when said leathery sheets are pressed together, (II) cutting flans of predetermined configuration from said superimposed laminae, (III) pressing said flans to adhere them, and (IV) separating unadhered leathery sheets according to their respective compositions.

16. In a process for the preparation of laminated metallic flans consisting essentially of at least two dissimilar compositions by the process of claim 1, the steps in combination of (I) preparing a core lamina and a core-covering lamina as leathery sheets consisting essentially of selected powdered metals and organic binder, (II) shaping the core sheet and the core-covering sheet into predetermined geometrical configurations, and (III) superimposing and adhering the core-covering configurations on the core configuration in such manner that all surfaces of said core are covered.

17. In a process for the preparation of laminated metallic flans consisting essentially of at least two dissimilar compositions by the process of claim 1, the steps in combination of (I) preparing a core lamina and core-covering lamina as leathery sheets consisting essentially of selected powdered metals and organic binder, (II) superimposing and adhering core-covering sheets on both sides of the core sheet to form a composite sheet, (III) cutting the composite sheet into predetermined geometrical configurations, and (IV) covering the exposed edge of the core sheet with a strip of the core-covering sheet in such manner that all surfaces of said core are covered.

18. In a process for the preparation of laminated metallic flans consisting essentially of at least two dissimilar compositions by the process of claim 1, the steps in combination of (I) within predetermined geometrically disposed areas of opposing surfaces of at least two flexible leathery sheets consisting essentially of selected powdered metals and organic binder, depositing softening solvent for said organic binder in amount sufficient to provide surface tackiness, (II) bringing said leathery sheets in contact, with said geometrically disposed areas in register, whereby adhesion thereof is effected, (III) cutting flans of predetermined configuration including said geometrically disposed areas, (IV) circumferentially surrounding the flans of step III with the composition of the outer faces so as to conceal the edges thereof.

19. A laminated, leathery sheet adapted to be fired to a sinterwelded integral sheet article composed of layers of dissimilar metals, comprising an inner core lamina consisting essentially of powdered metal and organic binder therefor and an outer lamina consisting essentially of different complementary powdered metal and organic binder therefor adhered to said core lamina and forming a continuous coating over the entire surface thereof.

20. In a process for the preparation of laminated metallic flans consisting essentially of at least two dissimilar cupronickel or billion alloys by the process of claim 1, the steps in combination of (I) depositing water in amount sufficient to provide surface tackiness, within predetermined areas of opposing surfaces of at least two flexible leathery sheets consisting essentially of selected proportions of copper with silver or nickel and hydrophilic organic binder, (II) bringing said leathery sheets into contact, with said tacky surface areas in register, whereby adhesion thereof is effected, to form a composite sheet, (III) cutting flans of predetermined configuration from said composite sheet within said tacky surface areas, and (IV) separating the remaining composite into the original leathery sheets according to their respective compositions.

References Cited
UNITED STATES PATENTS

| | | | |
|---|---|---|---|
| 2,341,732 | 2/1944 | Marvin | 29—192 |
| 2,593,943 | 4/1952 | Wainer | 75—214 |
| 2,902,363 | 9/1959 | Joyner | 75—214 |

DAVID L. RECK, *Primary Examiner.*

RICHARD O. DEAN, *Examiner.*